US009047636B2

(12) United States Patent
Ross

(10) Patent No.: US 9,047,636 B2
(45) Date of Patent: Jun. 2, 2015

(54) DYNAMIC DETERMINATION OF APPROPRIATE PAYMENT ACCOUNT

(75) Inventor: Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 474 days.

(21) Appl. No.: 13/035,807

(22) Filed: Feb. 25, 2011

(65) Prior Publication Data

US 2012/0221420 A1 Aug. 30, 2012

(51) Int. Cl.
| G06Q 20/20 | (2012.01) |
| G06Q 30/06 | (2012.01) |
| G07G 1/12 | (2006.01) |
| G06Q 30/02 | (2012.01) |
| G06Q 20/04 | (2012.01) |
| G06Q 20/40 | (2012.01) |
| G06Q 40/02 | (2012.01) |
| G06Q 20/10 | (2012.01) |
| G06Q 40/00 | (2012.01) |

(52) U.S. Cl.
CPC ...................................... *G06Q 40/00* (2013.01)

(58) Field of Classification Search
USPC .................. 705/39, 14.38, 42, 34, 40, 16, 21
See application file for complete search history.

(56) References Cited

U.S. PATENT DOCUMENTS

| 5,644,727 | A | * | 7/1997 | Atkins | 705/40 |
| 7,318,049 | B2 | * | 1/2008 | Iannacci | 705/39 |
| 7,587,363 | B2 | * | 9/2009 | Cataline et al. | 705/40 |
| 7,630,937 | B1 | * | 12/2009 | Mo et al. | 705/39 |
| 7,890,422 | B1 | | 2/2011 | Hirka et al. | |
| 2007/0005498 | A1 | * | 1/2007 | Cataline et al. | 705/42 |
| 2007/0162387 | A1 | | 7/2007 | Cataline et al. | |
| 2009/0119204 | A1 | * | 5/2009 | Akella et al. | 705/39 |
| 2009/0144166 | A1 | * | 6/2009 | Dickelman | 705/21 |
| 2009/0265241 | A1 | * | 10/2009 | Bishop et al. | 705/14.38 |
| 2010/0082445 | A1 | * | 4/2010 | Hodge et al. | 705/21 |
| 2010/0288834 | A1 | | 11/2010 | Tichelaer et al. | |
| 2010/0299195 | A1 | | 11/2010 | Nix et al. | |

OTHER PUBLICATIONS

PCT Search Report and Written Opinion for International Application No. PCT/US 12/26516 dated May 23, 2012.

* cited by examiner

*Primary Examiner* — Matthew Gart
*Assistant Examiner* — Reva R Danzig
(74) *Attorney, Agent, or Firm* — Michael A. Springs; Moore & Van Allen PLLC; Nicholas C. Russell

(57) ABSTRACT

Embodiments of the invention are directed to a system, method, or computer program product for dynamically determining an appropriate payment account for a transaction. Embodiments of the invention allow a user to receive a transaction request and subsequently the transaction is applied to the appropriate payment account. Applying the transaction to the appropriate payment account is based on the type of transaction, the payment accounts available to the user, financial institution considerations, financial plans of the user, customer plans of the user, etc. This invention allows a user to make a purchase at a point-of-sale and have confidence that the transaction will be implemented to the payment account that provides the best promotional benefits for the customer based on the customer's individual needs.

51 Claims, 9 Drawing Sheets

FINANCIAL INSTITUTION

WELCOME TO FINANCIAL INSTITUTION DYNAMICALLY DETERMINED PAYMENT DEVICE

PAYMENT ACCOUNT SET-UP 602

ACCOUNT INTERFACE 604

USER NAME 606  PASSWORD 608  SECURITY QUESTION 610

CONTINUE

ADD ACCOUNTS 612

SELECT TYPE 614  ACCOUNT INFORMATION 616

- CREDIT CARD 618
- DEBIT CARD 620
- RETAIL CARD 622
- LOC 624
- CREATE 626

BANK/MERCHANT 628  EXPIRATION DATE 632

ACCOUNT NUMBER 630  ROUTING NUMBER 634

ADD

ADD INFORMATION 636

FINANCIAL PLAN 638

CUSTOMER PLAN 640

FINANCIAL INSTITUTION CONSIDERATIONS 642

ADD

FINISHED 650

Figure 6

FINANCIAL INSTITUTION

WELCOME TO FINANCIAL INSTITUTION DYNAMICALLY DETERMINED PAYMENT DEVICE

FINANCIAL PLAN 702

FINANCIAL GOALS 704

ADD ACCOUNT 708

ACCOUNT INFORMATION 712

ADD GOAL 716

GOAL INFORMATION 720

PAYMENT GOALS 706

ADD ACCOUNT 710

ACCOUNT INFORMATION 714

ADD GOAL 716

GOAL INFORMATION 722

730 ADD

RANK GOALS 724

- [ ] SAVINGS ACCOUNT TO GOAL
- [ ] RETIREMENT ACCOUNT TO GOAL
- [ ] MORTGAGE REPAYMENT TO GOAL
- [ ] INVESTMENT ACCOUNT TO GOAL
- [ ] CREDIT CARD REPAYMENT TO GOAL

UPDATE

FINISHED

Figure 7

DYNAMIC DETERMINATION OF APPROPRIATE PAYMENT ACCOUNT

BACKGROUND

Customers typically have a variety of payment options when entering into a transaction with a business, such as but not limited to cash, check, gift cards, credit cards, debit cards, etc. Payment options, such as a credit or debit card, may be issued through financial institutions, retail stores, gas stations, airlines, and other businesses. Often, the businesses that issue the payment option provide promotions to entice customers to open payment accounts through the business and/or thereafter use the payment accounts. The promotions include, but are not limited to reward points, travel miles, cash back bonuses, product or store discounts, free gifts, etc. The promotions for each individual customer may vary based on the individual customer's purchasing habits. For example, one customer may receive better discounts at retail stores if the customer often shops at that retail store or if the customer selects to enroll in promotions that apply to the retail store.

Many factors play a role in the payment option a customer determines to use in a transaction. Factors, such as, but not limited to the amount of the transaction, whether the transaction is online or offline, the merchant, individual considerations, etc., may all have a direct correlation with which payment option is chosen by the customer. Individual considerations may consist of utilizing the proper payment method to maximize promotions. For example, if the customer is purchasing fuel at a specific gas station, it may be in the individual's best interest to use a credit card that offers maximum promotional discounts on fuel purchases.

Utilizing the proper payment option when making a transaction may aid in the customer reaching his promotional goals faster, by maximizing the profitability from a transaction. However, a customer often has little knowledge of what payment option provides the maximum promotion at a point of sale for a particular good or service (hereinafter "product") and/or merchant. Knowledge of the best payment option is difficult to determine. This is largely due to customers having so many payment options to select from, all with different promotions. A customer may not know the promotions associated with his payment options because the promotions may change at any instant, few or no merchants advertise promotions (except for maybe the merchant's own accounts), the promotions may include purchase restrictions that limit the benefits at different times, on different products, or at different merchants, etc. Therefore, the customer often selects a payment option, from the variety of payment options, and enters the transaction with little or no thought as to which payment options provide the best promotions as they relate to the goals he wishes to achieve.

BRIEF SUMMARY

Embodiments of the present invention address the above needs and/or achieve other advantages by providing apparatuses (e.g., a system, computer program product and/or other devices) and methods for dynamically determining an appropriate payment account, which allows a customer to make a financial transaction where the financial transaction request is directed to an appropriate payment account according to the customer's goals, short or long term. In some embodiments, the financial transaction may be made with a customer system, such as a mobile wallet (i.e. smart phone, personal digital assistant ("PDA"), etc.) or other electronic payment system. In some embodiments, the appropriate payment account may be one of a number of accounts available to the consumer at one or more businesses, such as, but not limited to a credit card, debit card, checking account, gift card account, shared account, equity line of credit, prepaid account, etc.

Embodiments of the invention allow a transaction request to be applied to an Appropriate payment account based at least in part on the planning goals of the customer, as well as financial institution considerations. The plans of the customer may be provided through customer input and may relate to financial goals and/or personal customer goals, such as, but not limited to short and/or long term savings plans, investment plans, vacation plans, etc. In other embodiments, the plans may be provided automatically by the financial institution using customer transaction history and/or financial planning information of the customer and/or similar customers. The plans provide an indication as to the saving habits, spending habits, and/or goals of the customer. The payment account selected to apply to a transaction may be based on the plans identified by the customer, such that the selected account provides the customer with the most financial benefit with respect to his plan (i.e., saving and spending goals). Furthermore, the customer may rank the importance of the plans, therefore providing the ability to provide the customer with an appropriate payment account to use in a transaction that is designated to the plan identified as most important by the customer.

In some embodiments, the financial transaction request may be a purchase made by a customer. The purchase can be made at a plurality of merchants, online or offline, over the phone, or at a plurality of point of sale systems. The purchase may be made by the customer using any type of payment device of a plurality of types of payment devices available to the customer.

In some embodiments, of the present invention, determining the type of transaction allows for initiation of selecting the appropriate payment account. In some embodiments, the type of transaction may be determined from the merchant or the point of sale system, wherein the type of product provided by the merchant may indicate the type of transaction (e.g. a purchase made from a gas station or a grocery store). In some embodiments, the type of transaction may be determined by the description of the transaction provided by the transaction receipt. In some embodiments, the type of transaction may also be determined by customer input of transaction information.

In some embodiments, of the present invention, selecting the appropriate payment account for the customer is based on several criteria, including the type of transaction, the types of payment accounts available to the consumer, a financial plan, a customer plan, and financial institution considerations. Selecting the appropriate payment account for the customer may require the system to review the criteria listed and select a payment account that best fits the criteria, via a processing device.

In some embodiments, of the present invention, the types of payment accounts available to the consumer may include any payment device the customer may use to make a transaction. These payment devices may include cash, check, credit cards, debit cards, retailer cards, mobile payment devices, and/or a plurality of lines of credit. In some embodiments, the plurality of types of payment accounts available to the customer may be determined by accessing a financial institution database and/or accessing other financial institutions. In some embodiments, the plurality of types of payment accounts available to the customer may be determined through manually inputted information by the customer.

In some embodiments, of the present invention, the financial plan used to determine the payment account for a transaction may include financial goals and payment strategies of the customer. The financial goals of the customer may include savings goals. These savings goals may include saving for a child's college, an investment, saving to reach a specific amount, etc. Further, the financial goals of the customer may include retirement savings goals. The payment strategies of the customer may include loan repayment (e.g. student loan repayment, car loan repayment, etc.). The payment strategies of the customer may include paying off credit cards (e.g. paying off one credit card with higher interest rates faster). Further, the payment strategies of the customer may include mortgage repayment. In some embodiments, the financial plan may be created by accessing a financial institution server. In some embodiments, the financial plan may be created by customer input via an interface. In some embodiments, the data within the financial plan may be ranked in order of importance for the customer.

In some embodiments, of the present invention, the customer plan used to determine the payment account for a transaction may include the location data of the customer (global positioning systems), vacation planning, emergency planning, social networking data, and tax planning. Vacation planning may include a customer saving for airfare or other travel expenses. For example, if the customer selects the customer plan of vacation planning, the system may direct the appropriate payment account for a transaction request to be a credit card with frequent flyer miles. Emergency planning allows the customer to direct the system to allocate transaction requests to accounts to maximize finances in case of an emergency situation. Tax planning allows the customer to direct the system to allocate transaction requests to accounts to maximize tax planning strategies set by the consumer. In some embodiments, the consumer plan may be created by accessing a financial institution server. In some embodiments, the consumer plan may be created by customer input via an interface. In some embodiments, the data, within the consumer plan may be ranked in order of importance for the customer.

In some embodiments, of the present invention, financial institution considerations used to determine the payment account for a transaction may include customer transaction history or a status update of payment accounts. Customer transaction history may include a review of previous transaction requests from the same merchant to determine the payment account the customer historically uses in that instance. For example, if a customer always uses a specific credit card for all purchases at a grocery store, the financial institution server will recognize this historically used credit card and apply the purchase from the grocery store to that card. A status update of payment accounts may allow, prior to applying the transaction request to a specific payment account, the server to access the selected account to ensure funds are available to continue processing the transaction. Financial institution considerations may also include item level data from the transaction. In some embodiments, a status update of payment accounts may ensure the credit limit for an account has not yet been reached. In some embodiments, financial institution considerations may be created by accessing a server.

In some embodiments of the present invention, applying the transaction request to the selected payment account may include accessing the selected payment account system. Accessing the selected payment account may be done via a network. In some embodiments, applying the transaction request to the selected payment account may include communicating the selected payment account with the customer via an interface. In some embodiments, applying the transaction request to the selected payment account may include confirming the transaction request with the selected payment account.

Embodiments of the invention relate to systems, methods, and computer program products for receiving a request to enter into a financial transaction; determining a type of financial transaction from the request to enter into the financial transaction; determining a payment account for a customer from two or more payment accounts based at least in part on the type of financial transaction in order to apply the financial transaction to the payment account that provides promotions that the customer desires; and applying the financial transaction to the payment account.

In further accord with an embodiment of the invention, determining the payment account for the customer is based at least in part on a financial plan. In another embodiment of the invention, the financial plan comprises financial goals and payment strategies of the customer. In yet another embodiment of the invention, the invention further comprises receiving a request to set up a financial plan.

In further accord with an embodiment of the invention, determining the payment Account for the customer is based at least in part on a customer plan. In another embodiment of the invention, the customer plan comprises vacation planning, emergency planning, or tax planning. In yet another embodiment of the invention, the invention further comprises receiving a request to set up a customer plan.

In further accord with an embodiment of the invention, determining the payment account for the customer is based at least in part on financial institution considerations. In another embodiment of the invention, the financial institution considerations comprise a status of the funds in the payment account. In yet another embodiment of the invention, the invention further comprises receiving a request to set up the financial institution considerations.

In still another embodiment of the invention, the invention further comprises determining the customer creating the request to enter into the financial transaction. In further accord with an embodiment of the invention, the invention further comprises determining the payment accounts that are available to make the financial transaction.

In another embodiment of the invention, the payment request is received from a customer system. In yet another embodiment of the invention, the payment request is received from a point of sale system at a merchant.

In still another embodiment of the invention, the invention further comprises sending a confirmation request to the customer on a customer system, and receiving a confirmation or a denial of the financial transaction.

In further accord with an embodiment of the invention, determining a payment account is done to maximize the cash equivalent of the promotions.

In another embodiment of the invention, the financial transaction can be a purchase of a product, a payment, or a transfer of funds. In yet another embodiment of the invention, the payment accounts comprise one or more of a credit card account, a debit card account, a line of credit account, a retail card, a savings account, or an investment account.

In still another embodiment of the invention, the invention further comprises receiving a request to rate customer goals; and wherein determining the payment account for the financial transaction is based at least in part on the customer goals rating. In further accord with an embodiment of the invention, determining the payment account for the financial transaction is based at least in part on the transaction history of the customer for similar financial transactions.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
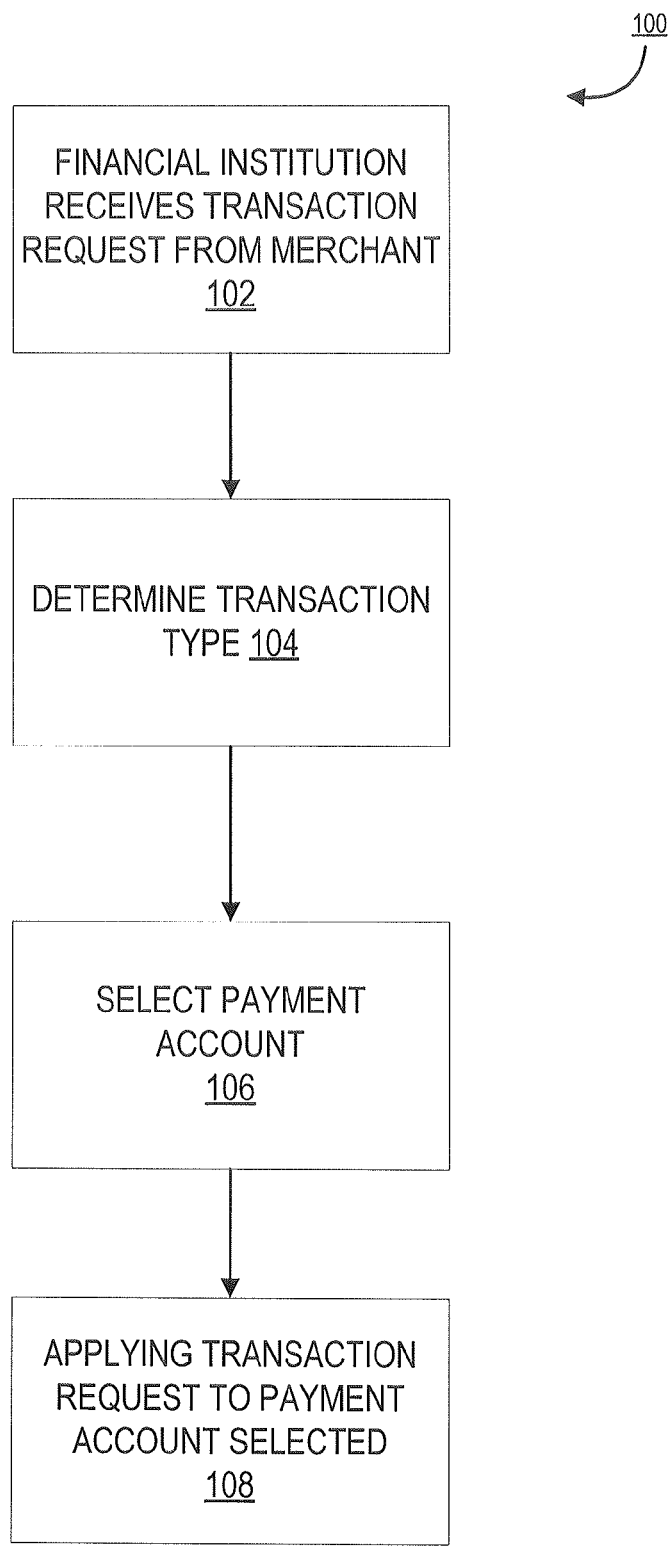
Figure 2:
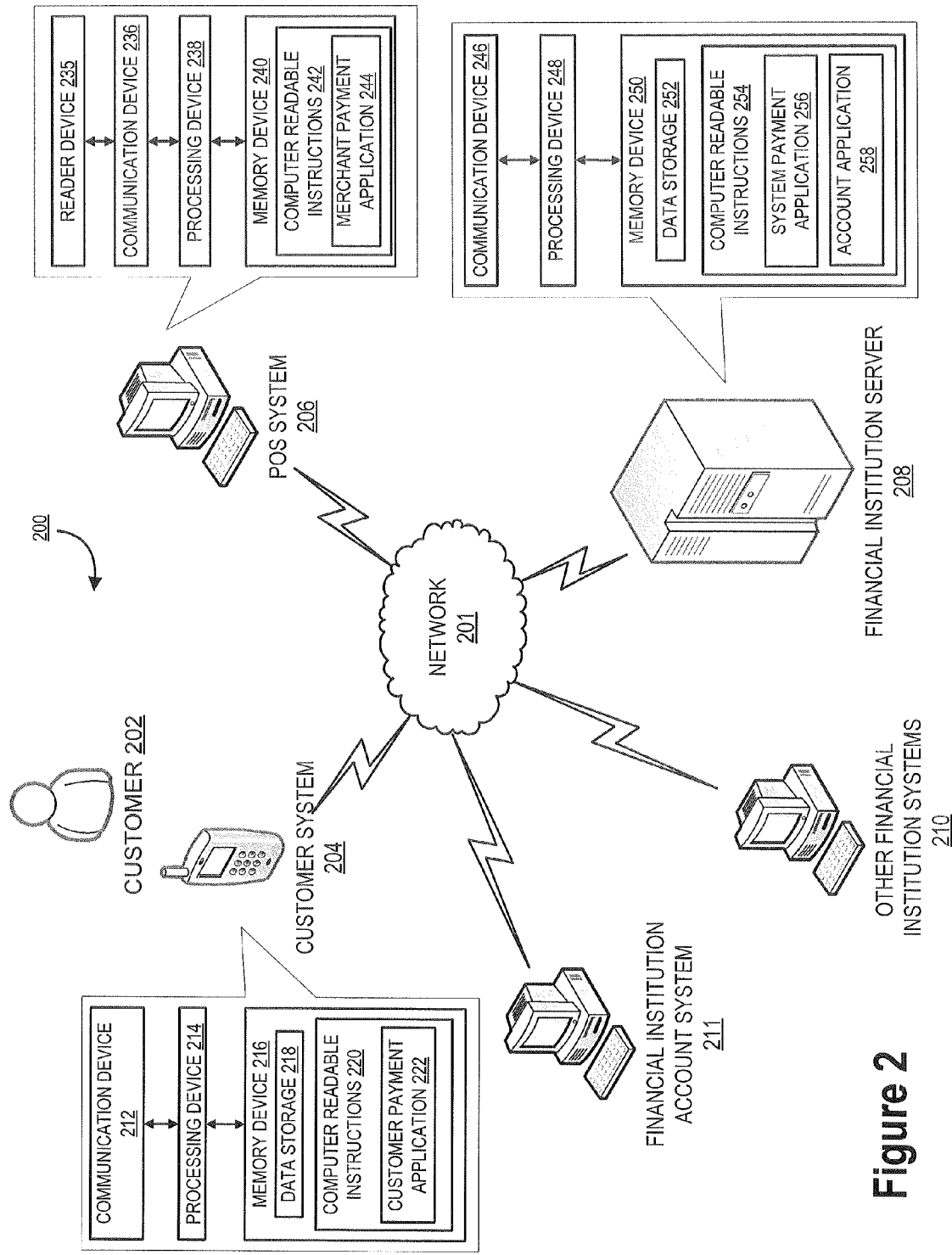
Figure 3:
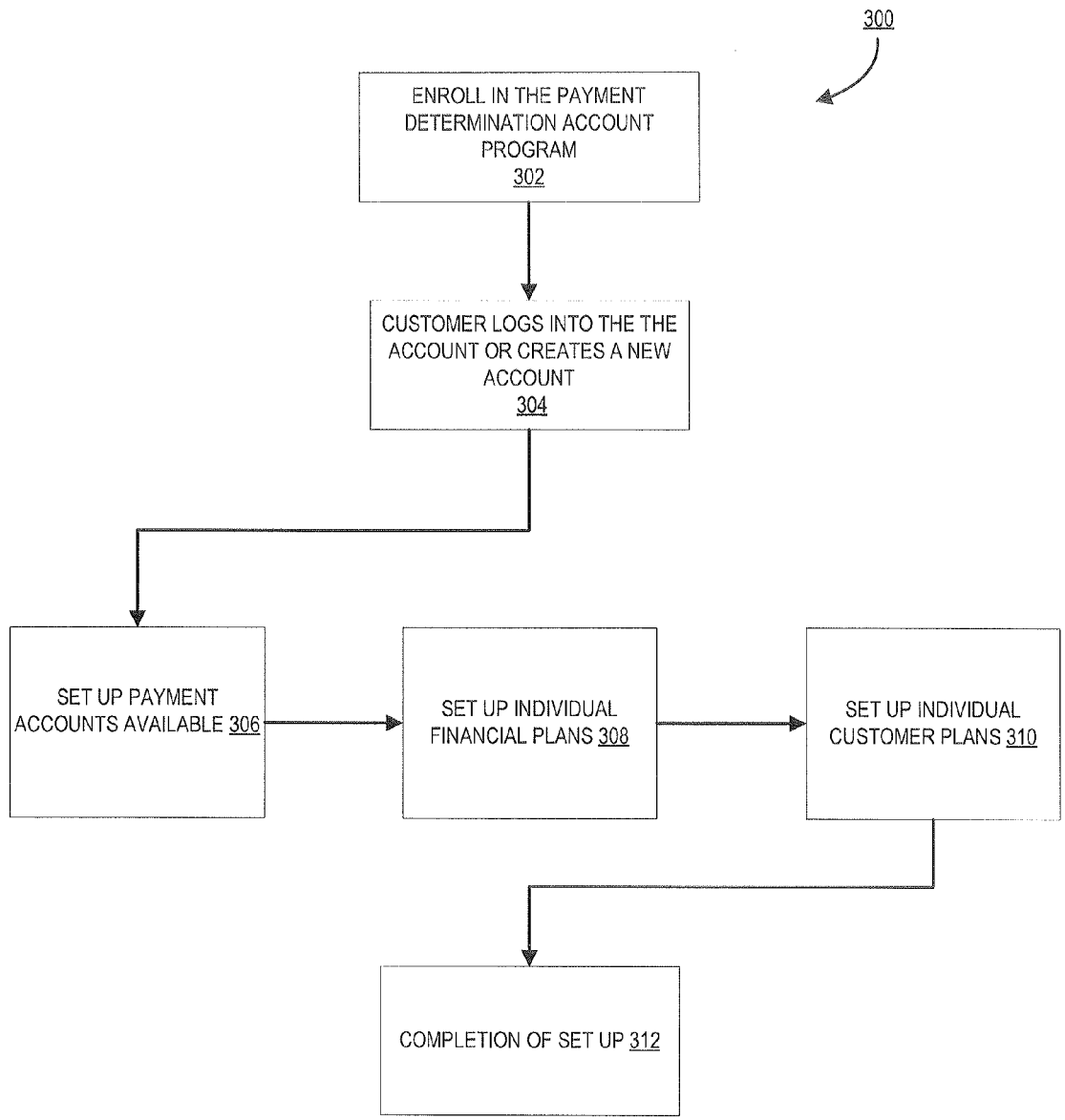
Figure 4:
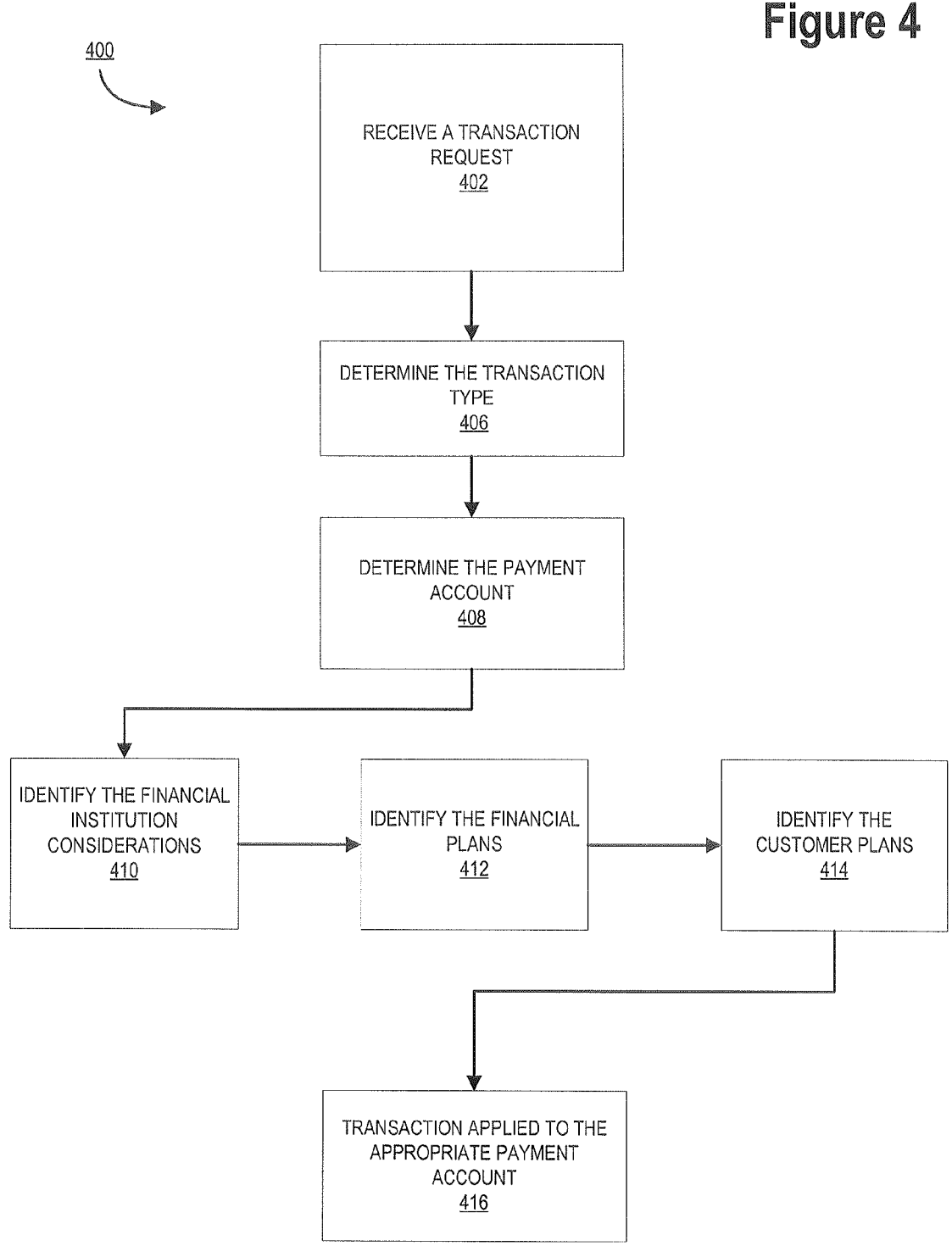
Figure 5:
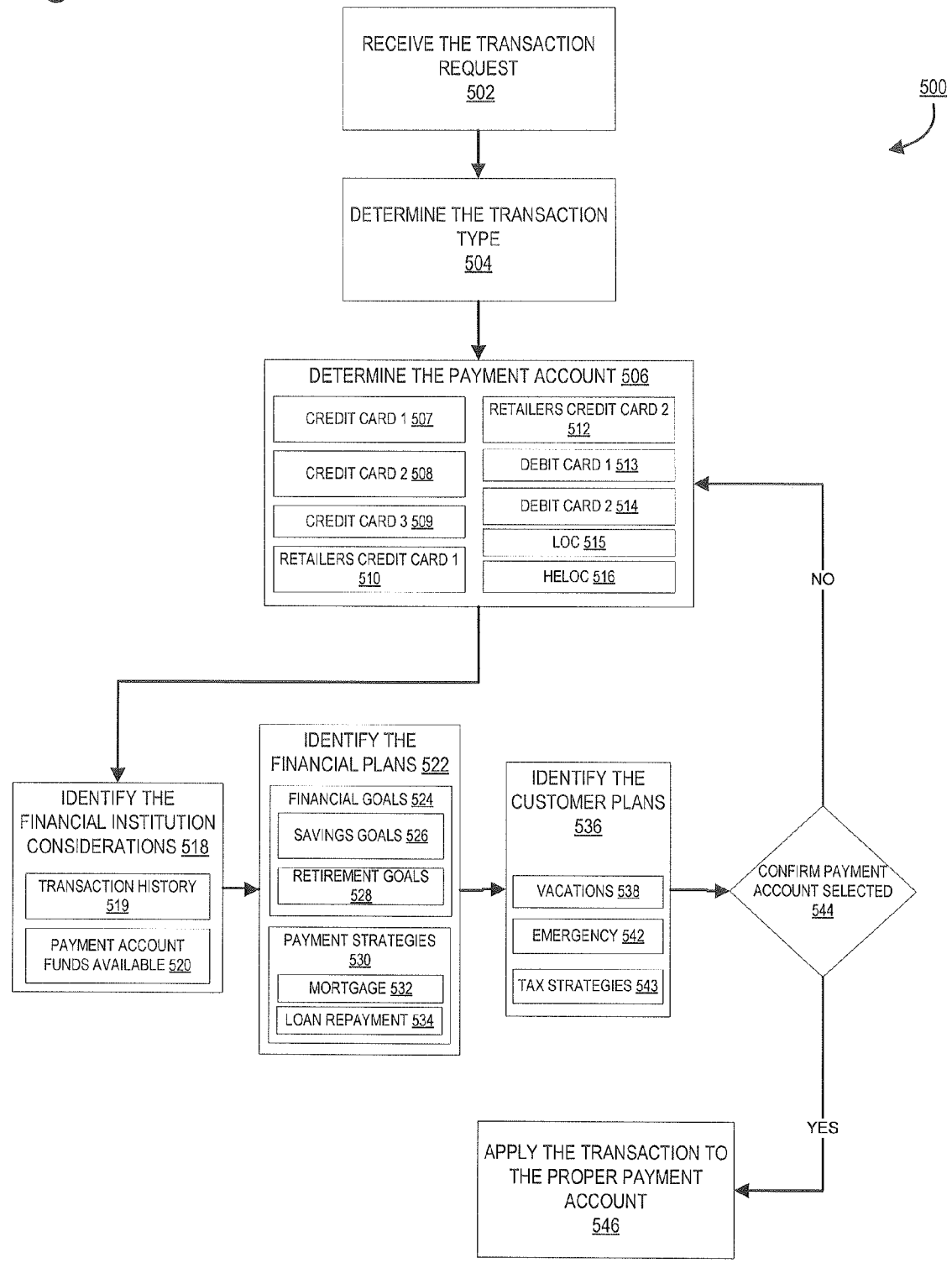
Figure 8:
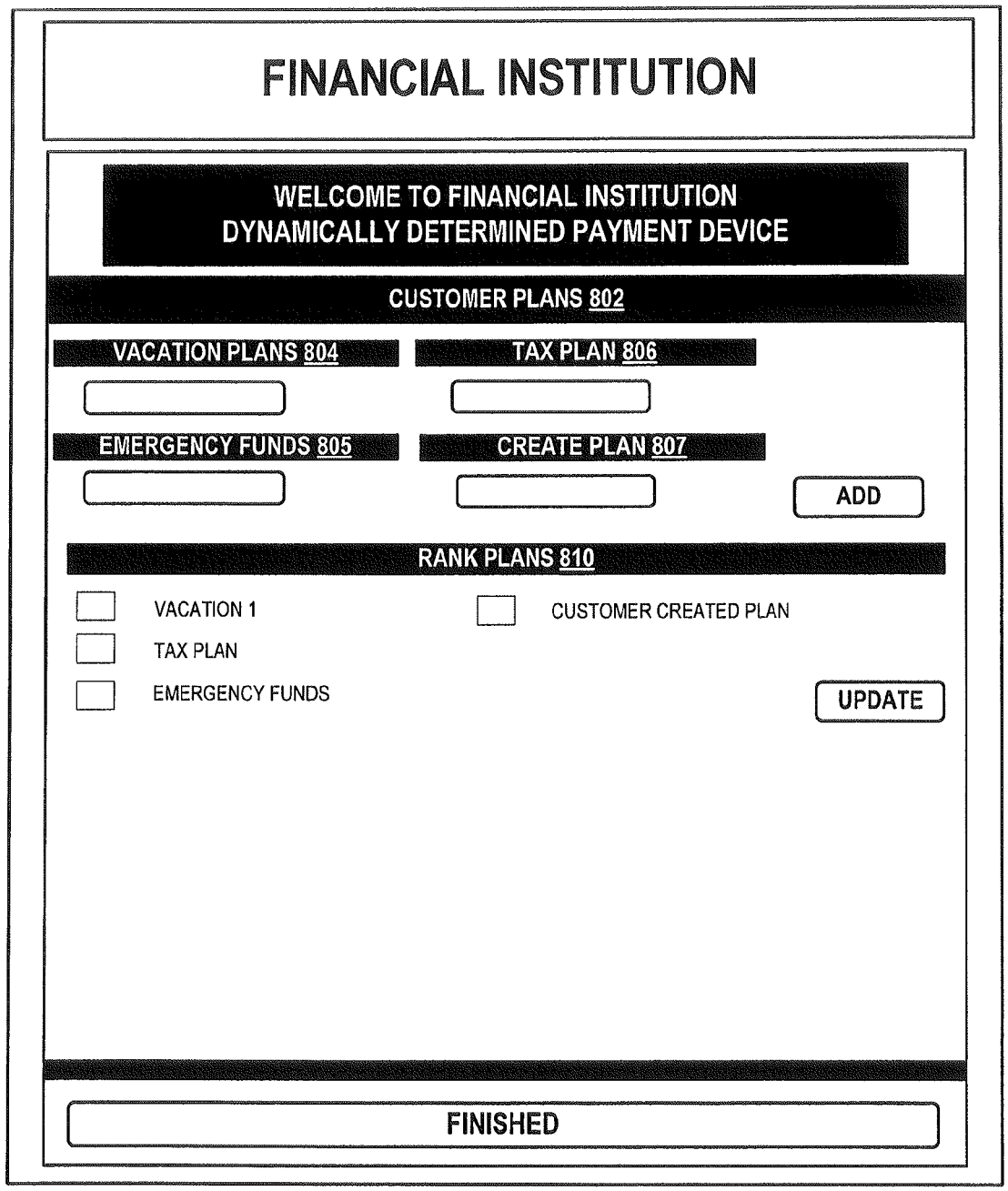
Figure 9:
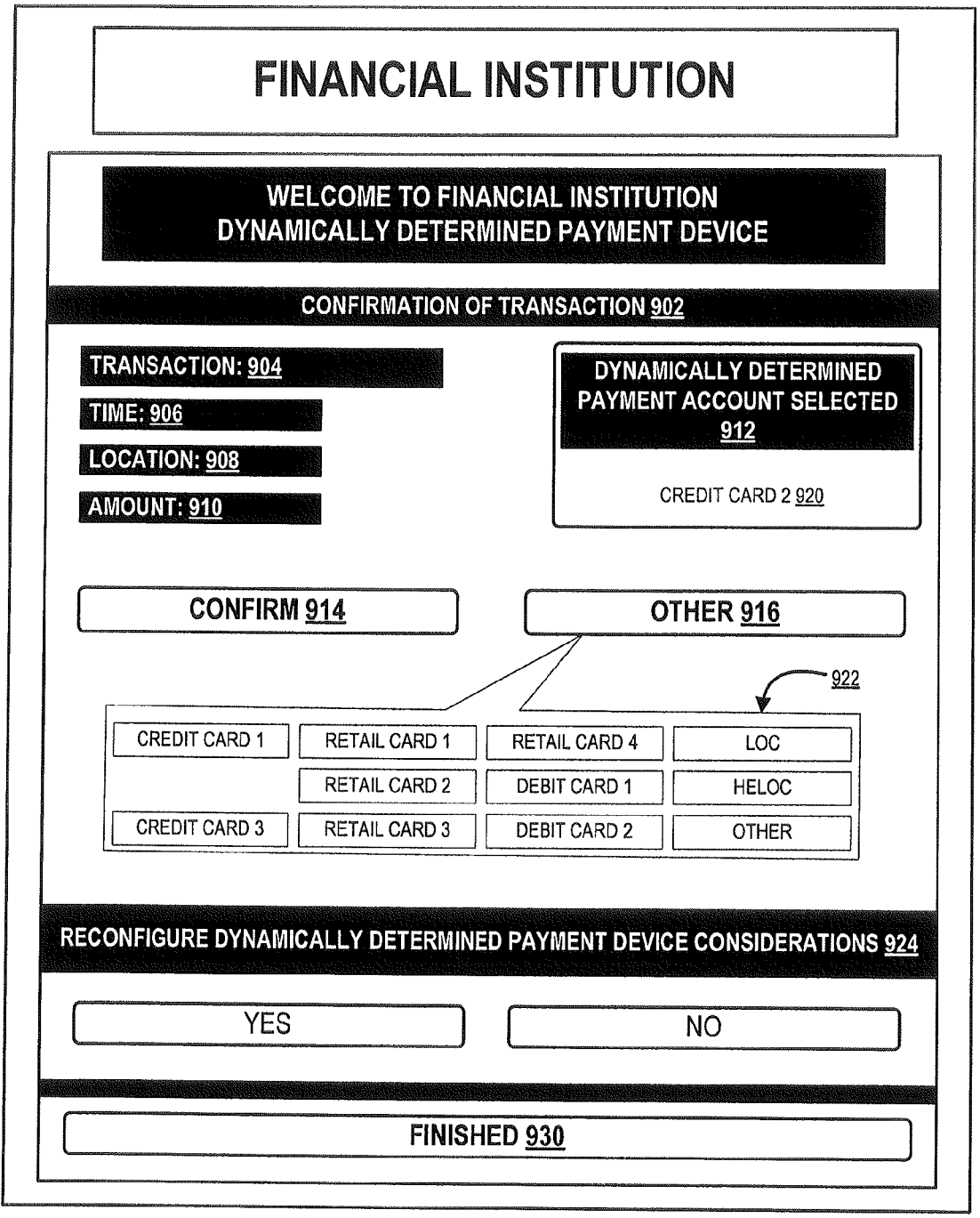

Having thus described embodiments of the invention in general terms, reference will now be made to the accompanying drawings, wherein:

FIG. 1 provides a high level process flow illustrating a payment account determination process, in accordance with one embodiment of the present invention;

FIG. 2 provides a payment account determination system environment, in accordance with one embodiment of the present invention;

FIG. 3 provides a process map illustrating a payment account set-up process, in accordance with one embodiment of the present invention;

FIG. 4 provides a process map illustrating a selection of a payment account transaction process, in accordance with one embodiment of the present invention;

FIG. 5 provides a process map illustrating a payment account selection process, in accordance with one embodiment of the present invention;

FIG. 6 provides a payment account set-up interface, in accordance with one embodiment of the present invention;

FIG. 7 provides a financial plan interface, in accordance with one embodiment of the present invention;

FIG. 8 provides a customer plan interface, in accordance with one embodiment of the present invention; and FIG. 9 provides a confirmation interface, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that offer payment account systems to customers.

FIG. 1 illustrates a high level process flow for a payment account determination process 100, which will be discussed in further detail throughout this specification with respect to FIGS. 2 through 9. The first step in the payment account determination process 100 is that the system at the financial institution receives a transaction request from a merchant, as illustrated by block 102. Next, the financial institution system identifies the type of transaction being made, as illustrated in block 104. Thereafter, the financial institution system determines a customer payment account based at least in part on the type of transaction and/or the financial plan, customer plan, and/or financial considerations, as illustrated in block 106. After the payment account is determined, the financial institution system applies the transaction request to the selected payment account to process the transaction, as illustrated in block 108.

FIG. 2 provides a payment account determination system environment 200, in accordance with one embodiment of the present invention. As illustrated in FIG. 2, the financial institution server 208 is operatively coupled, via a network 201 to the customer system 204, to the point-of-sale (POS) system 206, to other financial institution systems 210, and to the financial institution account system 211. In this way, the financial institution server 208 can send information to and receive information from the customer system 204, the POS system 206, other financial institution systems 210, and the financial institution account system 211, to associate transaction requests of the customer 202 to the appropriate payment account. FIG. 2 illustrates only one example of an embodiment of a payment account determination system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the customer 202 is an individual making a financial transaction. The financial transaction may be made at a POS system 206 of a merchant, online or offline, over the phone, at the merchant's place of business and/or other transaction means. The purchase may be made by the customer 202 using a customer system 204, such as a mobile wallet (i.e. smart phone, PDA, etc.) or other types of payment systems that communicate with POS systems 206 and/or financial institution servers 208 to allow the customer 202 to make a transaction. In some embodiments of the invention, the customer 202 may enter into transactions using a card with stored magnetic information, digital information, or other like payment device that stores information that may be transferred to a POS system 206 and/or a financial institution server 208 to allow a customer 202 to enter into a transaction. In some embodiments, the customer 202 may be a merchant or a person, employee, agent, independent contractor, etc. acting on behalf of the merchant to enter into a transaction.

As illustrated in FIG. 2, the financial institution server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the POS system 206, the customer system 204, the financial institution account system 211, and the other financial institution computer systems 210. As such, the communication device 246 generally comprises a modem, server, or other device for communicating with other devices on the network 201.

As further illustrated in FIG. 2, the financial institution server 208 comprises computer-readable instructions 254 stored in the memory device 250, which in one embodiment includes the computer-readable instructions 254 of an account application 258. In some embodiments, the computer-readable instructions 254 includes a system payment application 256 and/or an account application 258. In some embodiments, the memory device 250 includes data storage 252 for storing data related to the financial institution accounts including but not limited to data created and/or used by the account application 258, the system payment application 256, or the financial information of customers.

In the embodiment illustrated in FIG. 2 and described throughout much of this specification, the system payment application 256 allows the customer 202 to manually input, via a customer system 204, preferred appropriate payment account system criteria. In one example, the system payment application 256 allows the customer 202 to communicate, via the customer system 204, to indicate accounts available, financial plans, and customer plans to the system payment application 256. The data stored within the system payment application 256 provides computer readable instructions 254 to the processing device 248 to allow for selection of the appropriate payment account associated with a transaction. The system payment application 256 stores the preferred appropriate payment account system criteria including, but not limited to accounts available, financial plans, and customer plans that may be established by the customer 202. As used herein, accounts available, financial plans, and customer plans may be established by manual input by the customer 202 via the customer system 204 or established by the financial institution server 208 automatically.

In one embodiment, as explained in further detail below, the accounts available within the system payment application 256 include all financial accounts available to the customer 202. In some embodiments, the accounts available to the consumer may include payment accounts that the customer 202 has with a primary financial institution, secondary financial institution, or business that the customer may use to make a transaction. For example, these payment accounts may include cash, check, credit cards, debit cards, retailer cards, and/or a plurality of lines of credit. In some embodiments, the types of accounts available to the customer 202 may be determined by accessing the financial institution account system through the use of an account application 258 that may be stored in the memory device 250 of the financial institution server 208, or the memory device of the financial institution account system 211 itself. In other embodiments, the types of account available to the customer 202 may be determined by accessing other financial institution computer systems 210.

In one embodiment, as explained in further detail below, the financial plan stored within the system payment application 256 includes financial goals and payment strategies of the customer 202. For example, the financial goals of the customer 202 may include savings goals. These savings goals may include saving for a child's college, an investment, saving to reach a specific amount, etc. Further, the financial goals of the customer 202 may include retirement savings goals. For example, the payment strategies of the customer 202 may include loan repayment (e.g. student loan repayment, car loan repayment, etc.). The payment strategies of the customer 202 may include paying off credit cards (e.g. paying off one credit card with higher interest rates faster). Further, the payment strategies of the customer 202 may include mortgage repayment. In some embodiments, the financial plan may be created by accessing the financial information of the customer 202 stored in the memory device 250. In some embodiments, the financial plan may be created by customer 202 input via the customer system 204.

In one embodiment, as explained in further detail below, the customer plan stored within the system payment application 256 may include customer 202 location data, vacation planning, emergency planning, and tax planning. For example, vacation planning may include a customer 202 saving for airfare or other travel expenses. Emergency planning allows the customer to direct the system to allocate transaction requests to accounts to maximize finances in case of an emergency situation, such as a family illness. Tax planning allows the customer 202 to direct the system to allocate transaction requests to accounts to maximize tax planning strategies set by the consumer 202. In some embodiments, the consumer plan may be created by accessing financial information of the customer 202 stored in the financial institution account system 211. In some embodiments, the customer plan may be created by customer 202 input via the customer system 204.

In some embodiments, financial institution considerations may be created by accessing financial information of the customer 202 stored in the financial institution account system 211. In the embodiment illustrated in FIG. 2 and described throughout this specification, the account application 258 allows the financial institution server 208 to receive the financial information of the customer 202. In one example, the account application 258 accesses the transaction history of the customer 202 and/or the account status of the payment account that the customer 202 would like to use for various transactions. Customer transaction history may include previous transaction requests from the same merchant or other merchants, in order to determine the payment account the customer historically uses in various types of transactions. For example, a customer 202 always uses a specific credit card for all purchases at a grocery store, the financial institution server 208 may recognize the historically used credit card and apply the purchase from the grocery store to that card. The account application 258 may also access the financial institution account system 211 to ensure that the funds in a payment account are available prior to applying a transaction to a selected payment account. In some embodiments, the account status of the payment accounts may ensure that the maximum amount for an account has not yet been reached.

As illustrated in FIG. 2, the POS system 206 generally comprises a reading device 235, a communication device 236, a processing device 238, and a memory device 240. The reading device 235 is operatively coupled to the processing device 238, communication device 236, and the memory device 240. The POS system 206 may include a reader device 235 to receive payment account information from the customer 202 through the customer system 204 and/or other payment devices. Such a reader device 235 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device 235 receives information that may be used to identify the consumer's payment account and/or transaction data at the POS system 206 and communicates the information via the communication device 236 over a network 201, to other systems such as, but not limited to the financial institution server 208, other financial institution systems 210, and/or the financial institution account system 211. As such, the communication device 236 generally comprises a modem, server, or other device for communicating with other devices on the network 201.

As further illustrated in FIG. 2, the POS system 206 comprises computer-readable instructions 242 stored in the memory device 240, which in one embodiment includes the computer-readable instructions 242 of a merchant payment application 244.

In the embodiment illustrated in FIG. 2, the merchant payment application 244 allows the POS system 206 to be linked to the financial institution server 208 to communicate, via a network 201, the information related to the transaction being made, such as the transaction type, cost, product type, merchant location, etc. In one example, the customer 202 enters into a transaction at a POS system 206, which processes the transaction and the merchant payment application 244 allows communication of the transaction information to the financial institution server 208.

FIG. 2 also illustrates a customer system 204. The customer system 204 generally comprises a communication device 212, a processing device 214, and a memory device 216. The customer system 204 is a computing system that allows a user to enter into transactions, via a network 201, with the POS system 206, and/or supply the system payment application 256 with payment account information. The processing device 214 is operatively coupled to the communication device 212 and the memory device 216. The processing device 214 uses the communication device 212 to communicate with the network 201 and other devices on the network 201, such as, but not limited to the POS system 206, the financial institution server 208, the financial institution account systems 211, and the other financial institution computer systems 210. As such, the communication device 212 generally comprises a modem, server, or other device for communicating with other devices on the network 201.

As further illustrated in FIG. 2, the customer system 204 comprises computer-readable instructions 220 stored in the memory device 216, which in one embodiment includes the computer-readable instructions 220 of a customer payment application 222. In this way, a customer 202 may be able to enter into transactions at the POS system 206 and/or view his or her payment account information, update appropriate payment account criteria, and confirm selected payment accounts through the financial institution server 208, using the customer payment application 222. The customer system 204 may be, for example, a desktop personal computer, a mobile system, such as a cellular phone, smart phone, personal data assistant (PDA), laptop, or the like. Although only a single customer system 204 is depicted in FIG. 2, the payment account determination system environment 200 may contain numerous customer systems 204.

The other financial institution systems 210 are operatively coupled to the financial institution server 208, the POS system 206, the customer system 204, and/or the financial institution account systems 211 through the network 201. The other financial institution systems 210 have systems with devices the same or similar to the devices described for the financial institution server 208, the POS system 206, and/or the customer system 204 (i.e., communication device, processing device, and memory device). Therefore, the other financial institution systems 210 communicate with the financial institution server 208, the POS system 206, the financial institution account system 211, and/or the customer system 204 in the same or similar way as previously described with respect to each system. The other financial institution computer systems 210, in some embodiments, are comprised of systems and devices that allow the customer 202 and the financial institution server 208 to access account information at the financial institution and/or allow transactions using the customer 202 accounts at the financial institution.

The financial institution account system 211 is operatively coupled to the financial institution server 208, the POS system 206, the customer system 204, and/or the other financial institution systems 210 through the network 201. The financial institution account system 211 has systems with devices the same or similar to the devices described for the financial institution server 208, the POS system 206, and/or the customer system 204 (i.e., communication device, processing device, and memory device). Therefore, the financial institution account system 211 communicates with the financial institution server 208, the POS system 206, the other financial institution systems 210, and/or the customer system 204 in the same or similar way as previously described with respect to each system. The financial institution account system 211, in some embodiments, allows the financial institution server 208 to apply the transaction request to the payment account identified by the customer 202 or selected by the system payment application 256.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 illustrates a payment account set-up process 300, in accordance with one embodiment of the present invention. As illustrated in block 302, a customer 202 may select to enroll in the payment determination account program. The customer 202 may be able to enroll in the program by selecting a link provided by the financial institution to download an application on the customer system or to enroll through an online banking application provided by the financial institution or through the other financial institution systems 210.

FIG. 6 provides one embodiment of a set-up interface that allows a customer 202 to enroll into the payment account determination program. The financial institution server 208 receives a request from a customer 202 to set up the payment account determination program. If the customer 202 has not already enrolled, the financial institution server 208 may prompt the customer 202 to create a new account. As illustrated in block 304 of FIG. 3, the customer 202 creates a username and password for a new account or otherwise logs into the customer's payment account determination program if the customer 202 has previously set up an account. For example, illustrated in FIG. 6 is a payment determination account set-up interface 602 that allows a customer to create a log-in name and password to set up a payment determination account. In some embodiments, the set-up interface 602 requires entering information into an account interface 604. At this point, the customer 202 may enter a user name 606, a password 608, and for security purposes a security question 610. If the user name 606, password 608, and security question 610 are satisfactory, the interface prompts the customer to the next step in the process. For example, if the user name 606 is being used by a current customer, the new user will be prompted to create a different user name 606. In other embodiments, the customer may simply enroll in the payment determination account program through the customer's online banking application. In these embodiments, the interfaces described herein may be accessed through the online banking application.

The payment account set-up process 300 may continue after the customer 202 has created a new payment determination account, or logged into the payment determination account that the customer has previously set up. Thereafter, the customer 202 may provide additional information as illustrated in blocks 306, 308, and 310.

In block 306, the customer 202 provides information regarding the payment accounts available to him. The types of payment accounts available to the consumer 202 may include any account the customer 202 may use to make a transaction. These accounts may include cash accounts, checking account, a plurality of credit cards or debit cards, a plurality of retailer cards, a plurality of lines of credit, a plurality of gift cards, etc. For example, as illustrated in FIG. 6, the set-up interface 602 allows a customer 202 to add accounts to the payment determination account. In the add accounts section 612 of the set-up interface 602, the customer 202 can select the type of account 614 from a menu. The account selections include a credit card 618, a debit card 620, a retail card 622, a line of credit (LOC) 624, or a selection to create an account 626, to name a few. In other embodiments of the invention, other accounts may be added to the payment determination account. In one embodiment the account may be with the financial institution. In one embodiment the account may be with other financial institutions. In one embodiment the account may be with an account providing business. The create an account selection 626 allows a customer 202 to create an account that is not specifically mentioned in the select account type 614 menu. Once a type of account is selected 614, information regarding that account may be inputted in the account information section 616 in order to allow the financial institution to identify the proper account to apply a transaction to when it receives a transaction request. In some embodiments of the invention, the accounts that can be added to the payment determination account are all issued by the customer's primary financial institution. In other embodiments of the invention, accounts added to the payment determination account may be issued by multiple businesses. The businesses could be any company that provides accounts such as credit cards, retail store cards, or other types of accounts such as lines of credit. For example, in some embodiments of the invention, the customer 202 can add an account that is not issued by the customer's primary financial institution, such as a credit card account issued by a specific retailer or a secondary financial institution. In such embodiments, the customer 202 may need to provide account information in the account information section 616, so that the primary financial institution can access information regarding the account at the secondary financial institution or other business. In some embodiments, the account information section 616 may include a bank section 628, an account number section 630, the expiration date section 632, and the routing number section 634 in order to add accounts to the payment determination account. In other embodiments of the invention, a username and password may be entered to allow the primary financial institution to access account information located at the other businesses. Once the information in the account information section 616 is added, the customer 202 may select to add that account to the payment determination account.

As illustrated in block 308 of FIG. 3, after the setting up the payment accounts available in block 306, the customer 202 may continue the set-up process 300 by setting up individual financial plans. For example, financial plans may include financial goals and payment strategies of the customer 202. The financial goals of the customer 202 may include savings goals like saving for a child's education, a type of investment plan, saving for retirement, saving money to reach a specific goal amount, etc. Payment strategies may include repayment, such as repaying a student loan, a car loan, a personal bank loan, paying credit cards, mortgages, etc.

The customer 202 may decide not to set up financial plans at this time. However, if the customer 202 does choose to set up financial plans as illustrated by block 310, the set-up interface 602 illustrated in FIG. 6 provides an add information section 636 for adding additional information. In this section, the customer 202 may select financial plan 638 which may provide the customer 202 with a financial plans update interface 702, as illustrated in FIG. 7.

The financial plan interface 702 includes a section for financial goals. In the financial goals section 704, the customer 202 has an option of adding an account to a list of financial goals that can be associated with transactions being made by the customer 202 in an add account section 708. For example, the customer 202 may add a savings account to the financial goals to which the customer wants to apply cash back rewards. In some embodiments, the customer 202 may add account information, such as but not limited to the account number, financial institution at which the account is located, routing and transit number, etc. in the account information section 712. The financial goal section 704 may also include an add goal section 716 to add a goal to the associated account. In the add goal section 716, the customer 202 may add any goal he wishes to obtain in relation to the add account section 708. For example, the customer 202 may want to reach $X,XXX dollars in a savings account added to the financial plan interface 702. In this way, the system payment application 256 can select payment accounts to use in customer transactions that provide the greatest cash back bonuses, which can be applied in some embodiments, directly to the savings account. Once the add account section 708 and/or the add goal section 716 are filled in, the customer 202 may select the add button 730 to save the financial goals 704 the customer 202 inputted.

In another example, the customer 202 may have an investment account that the customer 202 may have a goal to reach $XX,XXX dollars in the account. The customer 202 may include the investment account in the add account section 708 and provide the goal in the add goal section 720. The system payment application 256 may analyze a transaction to see if the transaction would produce more savings in a savings account or more savings in the investment account (e.g. based on the rates of return of both accounts) when determining where to apply a cash back bonus. In other embodiments, the system payment application 256 may also determine to use a credit card or debit card depending on the transaction being made. For example, the credit card may provide a larger cash back bonus on a retail store purchase, while a debit card may provide a better cash back bonus on a grocery store purchase. The system payment application 256 determines the type of transaction and applies the proper account to the transaction based on which card provides more cash to apply to the savings account or investment account to reach the customer's financial goals.

In some embodiments of the invention, payment goals may also be included in the financial plan interface 702. Payment goals may include repayment options, such as credit card, loan, and/or mortgage options. For example, the financial plan interface 702 includes a payment goals section 706 for adding payment goals. In the payment goals section 706, the customer 202 has an option of adding an account in an add account section 710 in the same or similar way as previously described for adding a financial goal in the financial goal section 704 by adding account information in the add account information section 714. The payment goals section 706 also includes an add goal section 718 to add a goal to the payment account, which may be added in the same or similar way as previously described for adding a financial goal. In the add goal section 718, the customer 202 may add any goal he wishes to obtain in relation to the added payment account by providing in the add goal information section 722. Once the add account section 710 and/or the add goal section 718 are populated, the customer 202 may select to add the payment goals the customer 202 inputted. For example, the customer 202 may have student loans to repay. Therefore, the customer 202 may include these accounts as payment goals 706. In this way, the system payment application 256 can direct the cash back savings from various transactions to the specific payment goals entered by the customer 202.

FIG. 7 may also includes a rank goals section 724. The rank goals section 724 allows a customer 202 to rank the importance of reaching the goal such as the financial goal or payment goal. The ranking provides a selection box to add a numerical value to each of the goals, or other ranking or rating indicator. For example, the customer 202 that had student loans, a car loan, and a mortgage to repay may want to focus his repayments to the loan having the highest interest rates. Therefore, the customer 202 may rank the highest interest rate loan as the most important goal in his financial plan. In some embodiments, the ranking includes the accounts that were added from the financial plan section 702 and the payment goals section 706. In other embodiments the financial goals section 704 and the payment goals section 706 may be ranked separately or have separate interfaces for each type of goal. Once ranking is complete, the customer 202 may update the selections or changes by selecting the update button to save the changes to the financial plan 702.

As illustrated in block 310 of FIG. 3, the customer may continue the set-up process 300 by setting up individual customer plans. For example, customer plan may include vacation planning, emergency planning, social networking data, and/or tax planning. Vacation planning may include a customer 202 saving for airfare, lodging, or other travel expenses. Emergency planning allows the customer 202 to direct the system to allocate transaction requests to accounts to maximize finances in case of an emergency situation. Social networking data may include information that the customer 202 may "like" or other social networking data that may provide implications as to the customer's 202 future plans. Tax planning allows the customer 202 to direct the payment determination account to allocate transaction requests to accounts to maximize tax planning strategies set by the consumer 202.

The customer 202 may decide not to set up customer plans at this time. However, if the customer 202 does choose to set up customer plans, as illustrated by block 310, the set-up interface 602 illustrated in FIG. 6 has an add information section 636 for adding additional information. In the add information section 636, the customer 202 may select the customer plan 640 which will provide the customer 202 with a customer plan interface 802, as illustrated in FIG. 8.

As illustrated in FIG. 8, the customer 202 may select from several customer plan options including vacation plans, tax plans, emergency funds, and/or a personalized plan in a vacation plans section 804, a tax plan section 806, emergency funds section 805, and/or a personalized plan section 807 (including allowing access to social networking data). Once the customer 202 has selected the desired plan, the customer 202 may choose to add the selected plan to the payment determination account. After the customer 202 adds a plan or selects a plan for editing, the customer 202 can set goals on the limits (not illustrated) associated with the customer plan. For example, in one embodiment, the customer 202 may select a vacation goal plan that the customer 202 wants to save as many miles points as possible to reach twenty thousand (20,000) points for a free vacation. In this way, the system payment application 256 may determine the payment accounts that result in the accrual of the most mileage points. Thus, the system payment application 256 applies the transaction request to the payment accounts that receive the most mileage points. In other embodiments, the customer 202 may direct the system payment application 256 to use a payment account associated with providing the most frequent flyer miles, if the customer 202 is trying to plan for a trip. The customer 202 may also want to request that the system payment application 256 maximize cash back bonuses in case of an emergency.

In some embodiments, after the customer plans have been selected, the customer 202 may wish to rank the customer plans in the rank plans section 810. In one embodiment, the plans may be ranked or rated in the same or similar way as previously discussed for ranking or rating the financial plans.

Ranking the customer plans, as well as financial plans as previously discussed, may include a numerical ranking system or other ranking system that allows the customer 202 to rank the plans in order to achieve the goals that the customer 202 has set for each type of plan. For example, in one embodiment, the plans may be ranked from first to last, in which case the system payment application 256 may apply transaction requests to the payment account that will reach the goals of the plan in the order that they are ranked from first to last. In other embodiments, the customer 202 may assign a weighted value to each of the plans. In this way, the system payment application 256 may apply transaction requests to the payment account in order to apply the promotions to each of the goals of the plan in accordance to the weighted distributions. In still other embodiments of the invention, the customer 202 may want to maximize the promotions for all of the plans. In this way, the system payment application 256 may apply the payment account in each of the transactions that maximizes the equivalent cash value that can be applied to one or more transactions.

As illustrated in FIG. 6, the set-up interface 602 may also provide the customer 202 with the ability to allow the financial institution server 208 to include financial institution considerations in the appropriate payment account selection. The set-up interface 602 provides a financial institution considerations selection 642 for setting up financial institution considerations. In the add information section 636, the customer 202 may select the financial institution considerations selection 642, which may provide the customer 202 with a financial institution considerations section interface. In some embodiments, the customer may be able to set limits on the account discrepancy protections, balance limits, available funds, etc. to prevent the system payment application 256 from applying transactions to an account that may surpass the available balance or credit limit. In some embodiments of the invention, payments are automatically debited from an account on a monthly or weekly basis. Therefore, if the available balance or credit limit is close to the limit of the account, the customer may want to prevent the system payment application 256 from automatically applying a transaction to a payment account because it provides the best promotions if the customer 202 knows that automatic payments are about to be deducted from the account that could create an account discrepancy issue. In these cases, the customer 202 may be able to set up account limits that will not let a transaction be applied to a specific account if the balance on the account is at a predetermined level. In other embodiments of the invention, the customer may be prompted for acceptance when the system payment application 256 tries to apply a transaction to a particular account, as explained in further detail below. In other embodiments of the invention, the system payment application 256 may automatically make the determination not to apply a transaction to a payment account if the transaction may cause an account discrepancy based on future scheduled payments.

Block 312 of FIG. 3 allows for the completion of the payment account set-up process 300. Upon completion of the set-up process 300, the customer may choose the finish button 650 on the set-up interface 602 of FIG. 6. This may conclude the set-up process 300 and provide the system payment application 256 with the means to start to apply the payment accounts to transactions based on the promotions for the accounts, financial plans, customer plans, financial institution considerations, customer transaction history, etc.

FIG. 4 illustrates a payment account transaction process 400 for selecting a payment account to associate with a transaction. The first step in the payment account transaction process 400 is that the financial institution receives a financial transaction request for a customer 202, as illustrated by block 402. The financial transaction request received in block 402 corresponds to a financial transaction made by the customer 202. In some embodiments, the financial transaction may be a purchase by an individual at a merchant via a customer system 204. An individual customer 202 may make a purchase at a merchant, online or offline, over the phone, at POS systems 206, etc. For example, an individual may purchase groceries at a grocery store and clothing at a retail store and pay for both of these purchases using the same account, such as a credit card or other accounts that are a part of the payment determination account. The individual customer 202 may make the purchase with a customer system 204, credit card, debit card, or other payment device. If the account the customer 202 used to make the purchase is linked to an account that the customer 202 listed in add accounts section 612 of the payment determination account, the financial institution recognizes that the account is part of the customer's payment determination account.

The next step in the payment account transaction process 400 is that the financial institution determines the transaction type, as illustrated in block 406. Determining the type of transaction may allow the financial institution to determine to which account listed in the payment determination account to apply the transaction. For example, if the transaction is made for fuel at a gas station, the appropriate payment device may be the credit card that provides the largest percent cash back for that particular gas station. In some embodiments, the type of transaction may be determined based on the merchant or the POS system 206 from which the transaction request was received. In other embodiments of the invention, the type of transaction may be determined based on the type of product (e.g. fuel or clothing) purchased by the customer 202. In some embodiments, the type of product may be transmitted to the system payment application 256 in the transaction request, in addition to the merchant or POS system 206 at which the transaction occurred.

As illustrated by block 408 in FIG. 4, the next step in the process 400 is determining the payment accounts to which to apply the transaction. The payment accounts are accounts that the customer 202 has designated to be used in the payment account transaction process 400. The payment accounts designated may be determined by a combination of factors. If the customer 202 designated the account and account information in section 612 of FIG. 6, the account may then be available for the use in completing the transaction. Furthermore, if the customer 202 has prior accounts with the financial institution that are not associated with the payment determination account, the financial institution may recognize the accounts and include them among the available accounts identified in the payment determination account. Thereafter, the customer 202 may add the additional accounts not already included in the payment determination account to the list of available accounts at a later date. For example, the customer 202 may make a transaction using the customer system 204, such as a mobile wallet, or a credit card or other payment system that is linked to a specific account of the customer 202. The system payment application 256, may determine that the account is or is not a part of the customer's payment determination account. If the account is a part of the customer's payment determination account, the system payment application 256 may identify the types of accounts that the customer 202 listed as being a part of the customer's payment determination account. Otherwise, if the account that the customer 202 used for the transaction is not part of the customer's payment determination account, the transaction may just be applied to the account used in the transaction. However, if the account is part of the customer's payment determination account, then the system payment application 256 may determine to which account to apply the transaction based on the financial considerations, financial plans, and/or customer plans, as discussed in further detail below.

As illustrated by block 410 in FIG. 4, the next step in the payment account transaction process 400 is identifying the financial institution considerations. Financial institution considerations are criteria that the financial institution has in place or inputted by the customer 202 to prevent account discrepancy amounts, unwanted expenses, or identify customer 202 spending trends with respect to the customer's accounts. Financial institution considerations 410 may include customer transaction history analysis and account status inquires of the accounts used in the payment determination account. With respect to the transaction history analysis, customer transaction history may include a review of previous transactions a customer 202 made at various merchants in order to determine the payment account the customer 202 typically uses for the merchants. For example, the customer 202 may purchase office supplies from the same merchant using a card that provides two percent cash back on office supplies. Therefore, the system payment application 256 may use this information when determining the appropriate payment account to use in future transactions. For example, the system payment application 256 may determine that another card listed in the payment determination account, or another card that the customer was recently issued, provides three percent cash back on purchases for office supplies. In such cases, the payment application 256 may suggest using the card that pays three percent cash back in future transactions for office supplies. With respect to an account status inquiry of payment accounts, the system payment application 256 may access the selected payment account system 211 to ensure that funds are available in the respective account to process the transaction. In some embodiments, an account status inquiry of payment accounts may ensure the credit limit for an account has not yet been reached. For example, if the customer 202 previously made a large transaction prior to the current transaction being made, the account status inquiry may ensure that the transaction being made is not applied to an account that does not have the required funds, even if the account would provide the best promotional benefit to the customer 202. In this way, it may be ensured that account discrepancies the account will not occur due to the selection of a payment account with the best promotions.

As illustrated by block 412 in FIG. 4, the next step in the payment account transaction process 400 is considering the financial plans of the customer 202. Financial plans of the customer 202 may help the system payment application 256 to determine what payment account to use for a transaction, based on the financial goals and payment strategies of the customer 202. As previously discussed, financial goals may include savings goals such as saving for a child's college, an investment, saving to reach a specific amount, or saving for retirement savings goals. In some embodiments, a customer 202 may have multiple savings goals, of which some may be more important than others to the customer 202 at the particular time. In some embodiments of the invention, the system payment application 256 examines the financial plans set up by the customer 202, the ranking or ratings of the financial plans, and the promotions related to the transaction type for the payment accounts when determining what payment account to apply to the transaction.

As illustrated by block 414 in FIG. 4, the next step in the payment account transaction process 400 is identifying the customer plans of the customer 202. Customer plans may help the system payment application 256 to determine what accounts to use for a transaction, based at least in part on the customer's savings and/or spending plans. The customer plans may include vacation planning, emergency planning, tax planning, budget planning, etc. In some embodiments of the invention, the system payment application 256 may also examine the customer plans set up by the customer 202, the ranking or ratings of the customer plans, and the promotions related to the transaction type for the payment accounts when determining what payment account to apply to the transaction.

In some embodiments of the invention, the customer 202 may select features in the payment determination account to allow the system payment application 256 to override transactions that the customer makes using a payment account. For example, the customer may have used a first credit card at the point of sale for a purchase; however, the payment account that provides the maximum promotions for the purchase may be a second credit card that was not selected by the customer 202. Therefore, the system payment application 256 can override the first credit card used by the customer 202 and apply the transaction request to the second credit card. In some embodiments of the invention, the customer 202 may have a chance to confirm or reject the application of the transaction request to the alternative payment account.

As illustrated in FIG. 9, after a customer 202 makes a transaction, the customer 202 may be able to confirm or reject the payment account to which the system payment application 256 is applying the transaction request. FIG. 9 illustrates a confirmation transaction interface 902. In some embodiments, the confirmation transaction interface 902 can be displayed to the customer 202 on the customer system 204 whenever the customer 202 enters into a transaction, whenever the system payment application 256 changes the payment account to which a transaction request is applied, and/or if a user wants to change the payment account to which a transaction request is applied.

The confirmation of transaction interface 902 has information about the transaction request 904, including the time of the transaction 906, the location of the transaction 908, and the amount of the transaction 910. In the payment account selected section 912, the selected appropriate payment account is shown to the customer 202. For example, in FIG. 9, the selected appropriate payment account is credit card 2 920. If the customer 202 agrees with the payment account selected, he may confirm the selection with the confirm button 914 and the transaction will subsequently be applied to the selected payment account. However, if the customer 202 does not agree with the selected payment account, he may select another from a drop down box 922 of all the other payment accounts to which the customer 202 has access. The customer 202 also has the option of revisiting the payment account set-up interface 602, the financial plan interface 702, and/or the customer plan interface 802 by selecting the different criteria selection 924. When the customer 202 has finished updating the selected payment account, he may choose to complete the transaction and apply it to the selected payment account by selecting the finish button 930.

As illustrated by block 416, the final step in the payment account transaction process 400 of FIG. 4 is applying the transaction request to the payment account selected. The process of selecting the payment account takes into consideration the transaction type, the payment accounts available, the financial institution considerations, the financial plans, and the customer plans, when determining the appropriate payment account to which the transaction is applied.

FIG. 5 illustrates the payment account transaction process 400 in more detail with respect to the selection criteria described above. The payment account transaction process 500 includes selection criteria and customer 202 decision blocks. As illustrated by block 502, the process 500 begins by the system payment application 256 receiving a transaction request, as previously described above. Then, as illustrated by block 504, the system payment application 256 determines the transaction type, as previously described above. Thereafter, as illustrated by block 506, the system payment application 256 determines the payment accounts available to the customer 202. In some embodiments, the payment accounts could include a single account. In some embodiments, the payment accounts could include a plurality of accounts. For example, as illustrated in FIG. 5, the customer in this example has credit card 1 507, credit card 2 508, credit card 3 509, retailer credit card 1 510, retailer credit card 2 512, debit card 1 513, debit card 2 514, line of credit (LOC) 515, and a home equity line of credit (HELOC) 516. The payment accounts available are the accounts the system payment application 256 may select to which to apply the transaction.

As illustrated in FIG. 5, blocks 518, 522, and 536 are the selection criteria that the system payment application 256 examines prior to selecting the appropriate payment account, as previously explained above. First, in block 518, financial institution considerations are examined. For example, in FIG. 5, the financial institution considerations examined include the customer's transaction history 519 and the funds available in the payment accounts 520. Second, in block 522, financial plans of the customer 202 are examined. For example, in FIG. 5, the financial plans examined include the customer's financial goals 524, such as savings goals 526 and retirement goals 528; and payment strategies 530, such as mortgage repayment 532 and loan repayment 534. Third, in block 536, customer plans of the customer 202 are examined. For example, in FIG. 5 the customer plans examined include the customer's 202 vacation plans 538, emergency savings 542, and tax strategies 543.

After the system payment application 256 examines the criteria, the system payment application 256 selects an appropriate payment account to which direct the transaction request. Prior to applying the payment account to the transaction, as illustrated in block 546, the customer 202 may approve the selected payment account, as illustrated in decision block 544. In some embodiments, the customer 202 may approve or deny the selected payment account that the customer 202 is presented with by system payment application 256, using a confirmation transaction interface 902, as illustrated in FIG. 9 as previously explained above.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method comprising:
receiving an enrollment indication from a customer;
accessing data associated with two or more payment accounts available to the customer at a financial institution, wherein accessing data associated with the two or more payment accounts available to the customer is based on receiving the enrollment, wherein a financial institution server is accessed to identify the two or more payment accounts available to the customer from the financial institution;
determining financial considerations for the customer, based on the customer's transaction history, wherein financial considerations for the customer are determined by the financial institution and include payment accounts used most frequently for transactions with a merchant or for a product and funds available in the two or more payment accounts available to the customer;

receiving an indication of a financial transaction, wherein the indication of the financial transaction is based on receiving, at the financial institution, authorization of the transaction, wherein the customer is using a first payment account available to the customer for the financial transaction, wherein the use of the first payment account triggers an access to data associated with two or more payment accounts available to the customer;

determining a type of financial transaction, wherein the type of financial transaction is determined based at least in part on the merchant of the transaction and a product of the transaction;

determining, via a computer device processor, an appropriate payment account for the financial transaction of the customer from the accessed two or more payment accounts available to the customer based on the transaction using the first payment account, wherein determining an appropriate payment account is based on the type of financial transaction and the financial considerations of the customer, wherein financial consideration include the customer transaction history and funds available determined by the financial institution, wherein the appropriate payment account is a payment account from the two or more payment accounts available to the customer that matches the customer transaction history and includes appropriate funds for the transaction; and applying, dynamically, the financial transaction to the appropriate payment account independent of the first payment account the customer used during the financial transaction, whereby improving the customer payment method by utilizing the first payment account for any transaction and that transaction amount being applied to the appropriate payment account of the two or more payment accounts available to the customer.

2. The method of claim 1, wherein the financial plans of the customer comprise one or more customer financial goals, retirement goals, payment strategies, or customer plans, wherein customer plans include one or more of vacation planning, emergency planning, or tax strategies.

3. The method of claim 1, further comprising receiving a request from the customer to set up a financial plan at a financial institution.

4. The method of claim 1, further comprising receiving a request from the customer to set up a customer plan at a financial institution.

5. The method of claim 1, wherein determining the payment account for the customer is based at least in part on financial considerations.

6. The method of claim 5, wherein the financial considerations comprise a status of the funds in the two or more payment accounts.

7. The method of claim 5, further comprising receiving a request to set up the financial considerations.

8. The method of claim 1, further comprising determining the customer from a plurality of customers that are entering into the financial transaction.

9. The method of claim 1, further comprising determining the payment accounts that are available to make the financial transaction.

10. The method of claim 1, wherein the indication of the financial transaction is received from a customer system.

11. The method of claim 1, wherein the indication of the financial transaction is received from a point of sale system at a merchant.

12. The method of claim 1, further comprising:
sending a confirmation request to the customer on a customer system; and
receiving a confirmation or a denial of the financial transaction.

13. The method of claim 1, wherein determining an appropriate payment account is done to maximize a cash equivalent of the promotions.

14. The method of claim 1, wherein the financial transaction can be a purchase of a product, a payment, or a transfer of funds.

15. The method of claim 1, wherein the two or more payment accounts available to the customer comprise one or more of a credit card account, a debit card account, a line of credit account, a retail card, a savings account, or an investment account.

16. The method of claim 1, further comprising receiving a request to rate customer goals, wherein determining the appropriate payment account for the financial transaction is based at least in part on the customer goals rating.

17. The method of claim 1, wherein applying, dynamically, the financial transaction to the appropriate payment account independent of the payment account the customer used during the financial transaction comprises overriding the payment account the customer used during the financial transaction with the appropriate payment account.

18. A system comprising:
a memory device;
a communication device; and
a processing device operatively coupled to the memory device and the communication device, wherein the processing device is configured to execute computer-readable program code to:
receive an enrollment indication from a customer;
access data associated with two or more payment accounts available to the customer at a financial institution, wherein accessing data associated with the two or more payment accounts available to the customer is based on receiving the enrollment, wherein a financial institution server is accessed to identify the two or more payment accounts available to the customer from the financial institution;
determine financial considerations for the customer based on the customer's transaction history, wherein financial considerations for the customer are determined by the financial institution and include payment accounts used most frequently for transactions with a merchant or for a product and funds available in the two or more payment accounts available to the customer;
receive an indication of a financial transaction, wherein the indication of the financial transaction is based on receiving, at the financial institution, authorization of the transaction, wherein the customer is using a first payment account available to the customer for the financial transaction, wherein the use of the first payment account triggers an access to data associated with two or more payment accounts available to the customer;
determine a type of financial transaction, wherein the type of financial transaction is determined based at least in part on the merchant of the transaction and a product of the transaction;
determine an appropriate payment account for the financial transaction of the customer from the accessed two or more payment accounts available to the customer based on the transaction using the first payment account, wherein determining an appropriate payment account is based on the type of financial transaction and the financial considerations of the customer, wherein financial consideration include the customer transaction history and funds available determined by the financial institution, wherein the appropriate payment account is a payment account from the two or more payment accounts available to the customer that matches the customer transaction history and includes appropriate funds for the transaction; and apply, dynamically, the financial transaction to the appropriate payment account independent of the first payment account the customer used during the financial transaction, whereby improving the customer payment method by utilizing the first payment account for any transaction and that transaction amount being applied to the appropriate payment account of the two or more payment accounts available to the customer.

19. The system of claim 18, wherein the financial plan plans of the customer comprise one or more customer financial goals, retirement goals, payment strategies, or customer plans, wherein customer plans include one or more of vacation planning, emergency planning, or tax strategies.

20. The system of claim 18, wherein the processing device is further configured to execute computer-readable program code to receive a request from the customer to set up a financial plan at a financial institution.

21. The system of claim 18, wherein the processing device is further configured to execute computer-readable program code to receive a request from the customer to set up a customer plan at a financial institution.

22. The system of claim 18, wherein determining the payment account for the customer is based at least in part on financial considerations.

23. The system of claim 22, wherein the financial considerations comprise a status of the funds in the two or more payment accounts.

24. The system of claim 22, wherein the processing device is further configured to execute computer-readable program code to receive a request to set up the financial considerations.

25. The system of claim 18, wherein the processing device is further configured to execute computer-readable program code to determine the customer from a plurality of customers that are entering into the financial transaction.

26. The system of claim 18, wherein the processing device is further configured to execute computer-readable program code to determine the payment accounts that are available to make the financial transaction.

27. The system of claim 18, wherein the processing device is further configured to execute computer-readable program code to receive the indication of the financial transaction from a customer system.

28. The system of claim 18, wherein the processing device is further configured to execute computer-readable program code to receive the indication of the financial transaction from a point of sale system at a merchant.

29. The system of claim 18, wherein the processing device is further configured to execute computer-readable program code to:
send a confirmation request to the customer on a customer system; and
receive a confirmation or a denial of the financial transaction.

30. The system of claim 18, wherein the processing device configured to execute computer-readable program code to determine a payment account is done to maximize a cash equivalent of the promotions.

31. The system of claim 18, wherein the financial transaction can be a purchase of a product, a payment, or a transfer of funds.

32. The system of claim 18, wherein the two or more payment accounts available to the customer comprise one or more of a credit card account, a debit card account, a line of credit account, a retail card, a savings account, or an investment account.

33. The system of claim 18, wherein the processing device is further configured to execute computer-readable program code to receive a request to rate customer goals, wherein determining the appropriate payment account for the financial transaction is based at least in part on the customer goals rating.

34. The system of claim 18, wherein applying, dynamically, the financial transaction to the appropriate payment account independent of the payment account the customer used during the financial transaction comprises overriding the payment account the customer used during the financial transaction with the appropriate payment account.

35. A computer program product, the computer program product comprising at least one non-transitory computer-readable medium having computer-readable program code portions embodied therein, the computer-readable program code portions comprising:
an executable portion configured for receiving an enrollment indication from a customer;
an executable portion configured for accessing data associated with two or more payment accounts available to the customer at a financial institution, wherein accessing data associated with the two or more payment accounts available to the customer is based on receiving the enrollment, wherein a financial institution server is accessed to identify the two or more payment accounts available to the customer from the financial institution;
an executable portion configured for determining financial considerations for the customer based on the customer's transaction history, wherein financial considerations for the customer are determined by the financial institution and include payment accounts used most frequently for transactions with a merchant or for a product and funds available in the two or more payment accounts available to the customer;
an executable portion configured for receiving an indication of a financial transaction, wherein the indication of the financial transaction is based on receiving, at the financial institution, authorization of the transaction, wherein the customer is using a first payment account available to the customer for the financial transaction, wherein the use of the first payment account triggers an access to data associated with two or more payment accounts available to the customer;
an executable portion configured for determining a type of financial transaction, wherein the type of financial transaction is determined based at least in part on the merchant of the transaction and a product of the transaction;
an executable portion configured for determining an appropriate payment account for the financial transaction of the customer from the accessed two or more payment accounts available to the customer based on the transaction using the first payment account, wherein determining an appropriate payment account is based on the type of financial transaction and the financial considerations of the customer, wherein financial consideration include the customer transaction history and funds available determined by the financial institution, wherein the appropriate payment account is a payment account from the two or more payment accounts available to the customer that matches the customer transaction history and includes appropriate funds for the transaction; and an executable portion configured for applying, dynamically, the financial transaction to the appropriate payment account independent of the first payment account the customer used during the financial transaction, whereby improving the customer payment method by utilizing the first payment account for any transaction and that transaction amount being applied to the appropriate payment account of the two or more payment accounts available to the customer.

36. The computer program product of claim 35, wherein the financial plans of the customer comprise one or more customer financial goals, retirement goals, payment strategies, or customer plans, wherein customer plans include one or more of vacation planning, emergency planning, or tax strategies.

37. The computer program product of claim 35, further comprising an executable portion configured for receiving a request from the customer to set up a financial plan at a financial institution.

38. The computer program product of claim 35, further comprising an executable portion configured for receiving a request from the customer to set up a customer plan at a financial institution.

39. The computer program product of claim 35, wherein the executable portion configured for determining the payment account for the customer is based at least in part on financial considerations.

40. The computer program product of claim 39, wherein the financial considerations comprise a status of the funds in the two or more payment accounts.

41. The computer program product of claim 39, further comprising receiving a request to set up the financial considerations.

42. The computer program product of claim 35, further comprising an executable portion configured for determining the customer from a plurality of customers that are entering into the financial transaction.

43. The computer program product of claim 35, further comprising an executable portion configured for determining the payment accounts that are available to make the financial transaction.

44. The computer program product of claim 35, wherein the indication of the financial transaction is received from a customer system.

45. The computer program product of claim 35, wherein the indication of the financial transaction is received from a point of sale system at a merchant.

46. The computer program product of claim 35, further comprising:
an executable portion configured for sending a confirmation request to the customer on a customer system; and
an executable portion configured for receiving a confirmation or a denial of the financial transaction.

47. The computer program product of claim 35, wherein the executable portion configured for determining an appropriate payment account is done to maximize a cash equivalent of the promotions.

48. The computer program product of claim 35, wherein the financial transaction can be a purchase of a product, a payment, or a transfer of funds.

49. The computer program product of claim 35, wherein the two or more payment accounts available to the customer comprise one or more of a credit card account, a debit card account, a line of credit account, a retail card, a savings account, or an investment account.

50. The computer program product of claim 35, further comprising an executable portion configured for receiving a request to rate customer goals, wherein determining the appropriate payment account for the financial transaction is based at least in part on the customer goals rating.

51. The computer program product of claim 35, wherein the executable portion configured for applying, dynamically, the financial transaction to the appropriate payment account independent of the payment account the customer used during the financial transaction is configured for overriding the payment account the customer used during the financial transaction with the appropriate payment account.

* * * * *